United States Patent Office 3,473,897
Patented Oct. 21, 1969

3,473,897
METHOD FOR SEPARATING URANIUM AND PROTACTINIUM FROM SPENT MOLTEN FLUORIDE SALT MIXTURES CONTAINING RARE EARTH FISSION PRODUCTS
James H. Shaffer, Oak Ridge, David M. Moulton, Knoxville, and Warren R. Grimes, Oak Ridge, Tenn., assignors to the United States of America as represented by the United States Atomic Energy Commission
Filed July 18, 1968, Ser. No. 745,837
Int. Cl. C01g 43/00, 57/00
U.S. Cl. 23—325
9 Claims

ABSTRACT OF THE DISCLOSURE

A method for reprocessing spent molten metallic fluoride salt mixtures containing uranium is provided whereby uranium and bred-in protactinium values are selectively extracted from the salt phase containing rare earth fission products into an immiscible metal solution by controlling the reduction potential between the metal and salt phases. Uranium values, which are extracted first, are oxidized and transferred from the metal solution into a barren salt mixture for ultimate recycle to the reactor prior to extracting the contaminants. The protactinium values are then extracted into the metal solution, oxidized, and transferred from the metal solution into a molten salt outside the reactor environment to await decay of the protactinium-233 to uranium-233.

BACKGROUND OF THE INVENTION

The invention herein was made in the course of, or under, a contract with the United States Atomic Energy Commission. It relates generally to methods for reprocessing nuclear reactor fuels and more particularly to a liquid metal reductive extraction method for reprocessing molten metallic fluoride salts containing fissile and fertile materials.

Molten metallic halide salts have been demonstrated as nuclear reactor core and blanket fluids and may be employed in thermal and/or fast converter or breeder reactors. Of recent importance is the determination that a single fluid, double region molten salt breeder reactor, which is described in greater detail in copending application S.N. 733,843, filed on June 3, 1968 in the names of Edward S. Bettis et al. for "Single Fluid Molten Salt Nuclear Breeder Reactor," is feasible. In such a reactor, the molten salt will contain, in addition to the carrier material, thorium, uranium, protactinium and rare earth fission products. If these molten salt breeder reactors are to become efficient, the core and blanket fluids must be periodically or continuously reprocessed of bred-in protactinium and fission products, the latter of which generally account for more than 50% of the neutron absorption by non-gaseous fission products. Where thorium is present (e.g., either in the blanket salt for a two-region, two-fluid reactor or a core salt for a single region, two fluid reactor) thorium-232 is converted to uranium-233 and protactinium-233 is produced as an intermediate which if left in the reactor may capture a second neutron to produce non-fissionable uranium-234 instead of decaying to fissionable uranium-233.

Previously a process was demonstrated for reprocessing a two-region, two-fluid molten salt mixture. In the fuel salt containing uranium and rare earth fission products but not thorium or protactinium the uranium values were removed first from the molten fluoride core salt by fluorination. Then the rare earths were separated from the lithium-beryllium fluoride mixture by extraction into a bismuth-lithium solution. This was proposed because it was thought in the art that insufficient difference in reduction potentials for uranium and rare earth existed to permit the separation of uranium from the rare earths by this process. Furthermore, it was not thought possible to construct a single-fluid molten salt breeder reactor because it was not believed that there existed differences in the extraction potentials sufficient to separate uranium from protactinium and thorium and rare earths and protactinium from thorium and rare earths. It is therefore highly desirable and an object of this invention to provide an efficient method for reprocessing spent molten salt fluids of protactinium and fission product values which obviates the separate fluorination removal operation for uranium and also allows the construction of a single-fluid molten salt breeder reactor.

SUMMARY OF THE INVENTION

This object was achieved by the discovery that an electromotive series for uranium, protactinium, and thorium and the rare earth fission products did exist which could provide sufficient difference in reduction potentials to permit the selective, reductive separation of uranium and protactinium values from the molten fluoride salt by an extraction process. One embodiment of the invention comprises contacting a molten metal fluoride salt mixture, such as $LiF-BeF_2-ThF_4-UF_4$ (67.68–20.0–12.0–0.32, mole percent) useful as a single fluid, double region fuel, with molten bismuth and adding incrementally to the salt mixture quantities of a metal reductant which is less noble than protactinium whereby the uranium, and protactinium values are sequentially reduced to metal, transferred into the metal phase, and separately recovered by bubbling hydrogen fluoride through recovery molten fluoride salt mixtures, which are brought in contact with the metal phase, or by using other oxidation methods, thereby oxidizing the species to their respective fluorides and transferring them into the salt phase. The uranium values may be recycled to the reactor for further service and the protactinium values retained in a separate molten salt mixture awaiting their decay to uranium-233.

It may thus be seen that by this method the removal of uranium in a separate, highly corrosive, time consuming, processing operation by fluorination prior to extracting the protactinium values from the salt mixture is obviated. Moreover, the method of the invention lends itself to high volume throughput consistent with minimum space availability within the reactor containment facilities and is readily adaptable to remote processing with a minimum of control.

DESCRIPTION OF THE PREFERRED EMBODIMENTS

Figure 1:
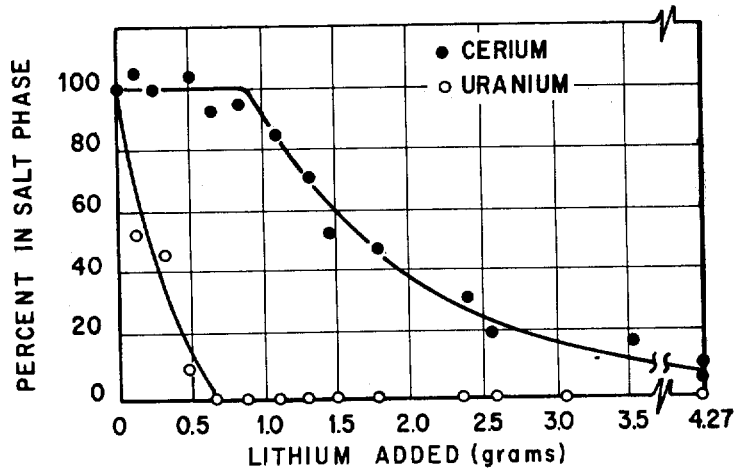
FIG. 1 is a plot showing the separation of uranium from cerium by reductive extraction with lithium from $LiF-BeF_2-UF_4$ (65.97–34.0–0.03, mole percent) into bismuth at 600° C.

In carrying out the invention a molten metal fluoride salt of, for example, $LiF-BeF_2-ThF_4-UF_4$ (71.7–16.0–12.0–0.3, mole percent) is contacted with an immiscible, molten, inert metal extractant, such as bismuth. This step may be conducted either batchwise or continuously. To initiate extraction of the bred-in materials from the spent molten salt a quantity of metal reductant selected from beryllium, lithium, and thorium is added to the salt or metal phase to reduce fluoride values to metal and concomitantly effect a transfer of the reduced metal values into the metal extractant. It has been found that an order of nobility, i.e., uranium>protactinium>rare earth fission products and thorium exists which permits the selective removal of uranium and protactinium by control of the concentration of reductant in the salt-metal system. It will be noted that in order to remove the bred-in materials, the uranium, which is more electronegative than protactinium or fission products, must be removed first. Accordingly, addition of the reductant is made to the system in a controlled manner to remove first all the uranium, then the protactinium. Where the metal extractant is reused for the extraction of each of the species, it is necessary in order to recover the uranium values for recycle, to remove the reduced uranium metal from the metal extractant prior to extracting the protactinum. This may conveniently be effected by contacting the metal extractant with a recovery salt, which may preferably, but not necessarily, be of the same composition as the fuel mixture, and bubbling hydrogen fluoride therethrough, thereby oxidizing the uranium in the molten metal phase to its tetrafluoride salt and causing its transfer into the recovery salt. Alternatively, the metal extractant which contains the reduced uranium metal may be stored until the bred-in materials are removed from the spent molten salt into a separate metal extractant and then transferred into the purified molten salt by oxidizing the uranium metal to fluoride and causing the uranium fluoride to cross the metal salt interface into the molten salt, which may then be returned to the reactor. In a similar fashion, after the uranium values are separately removed and recovered, the protactinium values are separated from the rare earth fission products for retention in a separate molten salt, which may be of the same composition as the fuel mixture, outside the reactor environment to await their decay to uranium-233. It will be apparent that the above separations can be improved by the application of multistage processing.

The method of this invention is applicable to a wide range of molten fluoride salt mixtures useful as fuels for molten salt breeder reactors. Nonlimiting examples of these salt compositions include fluorides of the alkali metals, such as potassium fluoride, sodium fluoride, and lithium fluoride; and beryllium fluoride as molten salt mixtures with thorium fluoride and uranium tetrafluoride.

Where, for example, the molten salt mixture contains fissile and fertile material (i.e., a single fluid, double region fluid), concentrations of the rare earth fluorides and protactinium fluoride should typically be maintained at <100 p.p.m. and <25 p.p.m., respectively. As noted hereinbefore the quantity of metal reductant is provided in an amount sufficient to remove substantially all of the uranium and protactinium sequentially from the molten salt mixture. Since the distribution of these elements between the two liquid phases is regulated by equilibrium reactions of the type $$4MF_{n(salt\ phase)} + nTh°_{(metal\ phase)}$$
$$\rightleftharpoons {}_n4M°_{((metal\ phase)} + nThF_{4(salt\ phase)}$$

where M is uranium or protactinium of valence $n$, the actual quantity of reductant required depends on the relative concentrations of salt phase constituents and the concentration thorium required in the metal phase to effect the reduction of each selected metal. Thorium concentrations of less than .003 mole fraction in bismuth suffice for removing essentially all uranium and protactinium values from the molten fluoride mixtures.

While any metal which is less noble than protactinium may serve as an equivalent reductant, certain considerations must be taken into account in its selection. It should be apparent that the metal reductant should be selected so as to avoid the addition of new metals to the molten salt and to minimize alteration of the chemical composition of the solvent mixture. Where the molten salt consists of lithium and beryllium fluorides, lithium or beryllium is preferred as the reductant. On the other hand, lithium, beryllium or thorium is preferred as the metal reductant for reprocessing either core salts for a single fluid, double region molten salt reactor or blanket salts for a two fluid, two region molten salt breeder reactor.

The temperature at which the extraction process is conducted may vary over a wide range. In general, both streams should be maintained at a temperature above the liquidus temperature of the particular molten fluoride salt employed. To insure a safe margin for process control, it is preferred that the temperature of the two streams be maintained at least 50° C. above the liquidus temperature of the molten salt. Higher temperatures may increase the corrosion rate of container materials and the complexity of operation; temperatures in excess of about 900° C. are not recommended. For a single fluid, double region molten salt composition of $LiF-BeF_2-ThF_2-UF_4$ (71.7–16.0–12.0–0.3, mole percent) a preferred reprocessing temperature range is 550° to 750° C.

Having described the invention in a general fashion the following examples are given to indicate with greater particularity the process parameters and techniques.

Example I

The feasibility of separating uranium from cerium by reductive extraction from a typical two-region molten salt breeder reactor fuel solvent into bismuth was established by the following example. A charge of 2.766 kg. of $LiF-BeF_2-UF_4$ (65.97–34.0–0.03, mole percent) containing 1.383 g. of cerous fluoride and about 1 mc. cerium-144, was placed in contact with 3.826 kg. of bismuth at 600° C. in a steel vessel. In an exploratory first step the cerium and uranium were reduced into the bismuth by addition of 3.2 grams of lithium metal. Then all of the cerium (~350 p.p.m.) and about half of the uranium (~900 p.p.m.) were reoxidized into the salt by addition of bismuth trifluoride. In the main part of the experiment successive small amounts of lithium metal reductant were added to the system and samples taken at 4 and 24 hours after the addition. Both the filtered salt samples and the unfiltered metal samples weighed an average of 2–3 grams.

The results are plotted in FIG. 1. For clarity the uranium concentration is expressed as a percentage of that found at the beginning of the second reduction. It is clear that uranium can be entirely removed from cerium in this way. At the point where substantially all the uranium was removed from the salt the separation factor of uranium from cerium was found to be about 4800. Since other experiments have shown that cerium is one of the most easily reduced rare earths, the separation factor between uranium and the other rare earths should be at least as large.

Example II

In this experiment separation of uranium, protactinium and thorium by reductive extraction from a typical two-fluid molten salt breeder reactor blanket material was established. A charge of 2.937 kg. of LiF–BeF$_2$–ThF$_4$–UF$_4$ (72.98–2–25–0.03, mole percent) containing about 1 mc. of protactinium-233 was placed in contact with 2.35 kg. of bismuth in a graphite vessel at 650° C. Successive small amounts of thorium metal reductant were added. Filtered samples were taken of each phase about one hour after each addition and analyzed by standard chemical and radiochemical methods.

Figure 2:
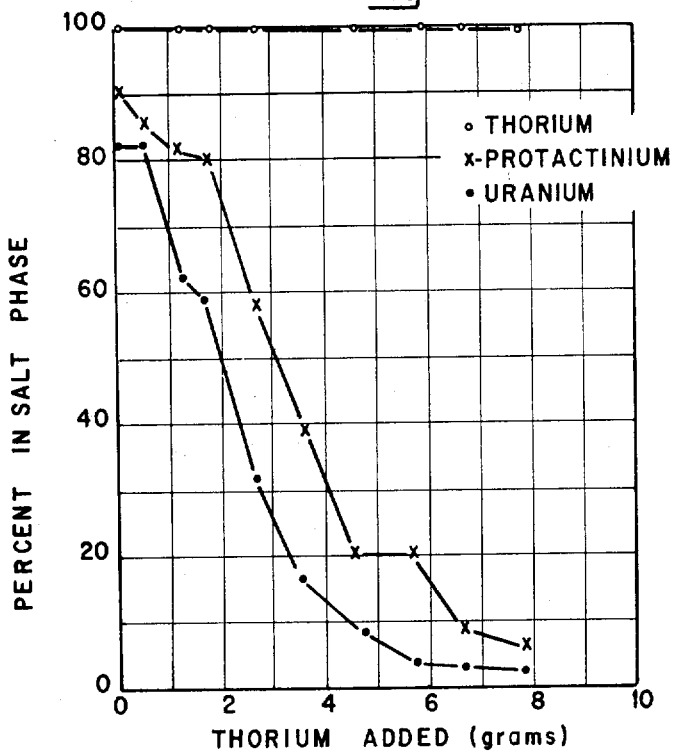
FIG. 2 is a plot showing the separation of uranium from protactinium and protactinium from thorium by reductive extraction with thorium from $LiF-BeF_2-ThF_4-$ $UF_4$ (72.98–2.0–25.0–0.02, mole percent) into bismuth at 650° C.

The results are plotted in FIG. 2. The separation factor between uranium and protactinium is about 10, while the separation factor between protactinium and thorium is about 1000.

In a similar experiment 2.52 kg. of LiF–BeF$_2$–ThF$_4$ (73–2–25, mole percent), a simulated blanket salt, containing 1 mc. of protactinium-233 and 213 p.p.m. uranium was floated on 3.6 kg. of bismuth maintained in contact with 0.5 kg. of LiF–NaF–KF (46.5–11.5–42.0, mole percent) recovery salt. To the blanket salt mixture, 4 gram-equivalents of beryllium metal were added in small increments and hydrogen fluoride bubbled through the recovery salt to provide oxidizing conditions so as to cause the protactinium and uranium metal values carried by the bismuth to transfer into the recovery salt.

Example III

The feasibility of separating uranium from protactinium by reductive extraction from a typical single-fluid molten salt breeder reactor fuel solvent into bismuth was established by the following experiment. A charge of 3.15 kg. of LiF–BeF$_2$–ThF$_4$–UF$_4$ (71.7–16.0–12.0–0.3, mole percent) containing about 1 mc. of protactinium-233 was placed in contact with 3.00 kg. of bismuth in a graphite vessel at 600° C. Successive small amounts of thorium metal reductant were added. Unfiltered samples (~1 gram each) were taken of each phase after each addition and analyzed by standard chemical and radiochemical methods.

Figure 3:
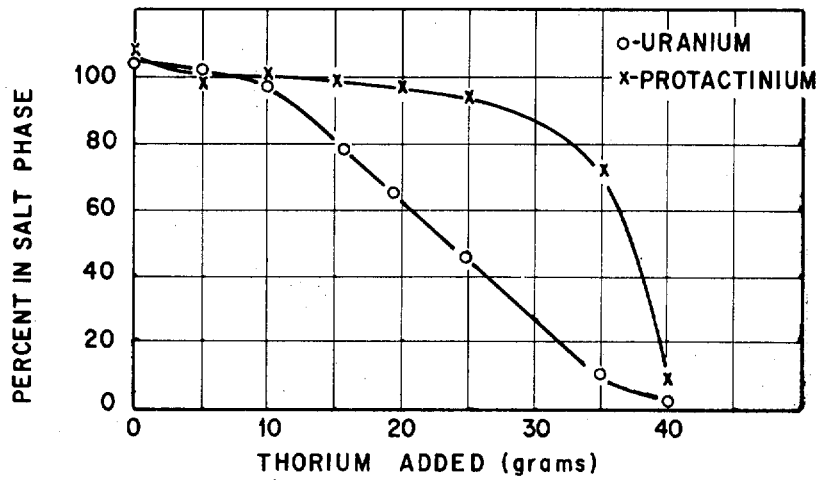
FIG. 3 is a plot showing the separation of uranium from protactinium by reductive extraction with thorium from $LiF-BeF_2-ThF_4-UF_4$ (71.7–16.0–12.0–0.03, mole percent) into bismuth at 600° C.

The results, which are plotted in FIG. 3, indicate that uranium extracts more easily than protactinium. Here the separation factor is about 30 so that in this salt the separation of uranium and protactinium can be made somewhat more readily than in Example II.

Example IV

The purpose of this experiment was an examination of distributions of $^{233}$Pa between the simulated fuel solvent of a single-region MSBR and bismuth as a function of the thorium concentration in bismuth up to its limit of solubility at 600° C. Approximately 3 kg. of bismuth was weighed into the graphite lined extraction vessel, heated to 900° C. under flowing helium, and sparged with hydrogen to remove moisture from the graphite liner and to reduce oxides from the bismuth. The salt mixture comprising LiF–BeF$_2$–ThF$_4$ (72–16–12, mole percent) was prepared separately in nickel equipment by combining fluoride salt components with a small quantity of irradiated thorium dioxide. This mixture was heated to 650° C. and, upon melting, was sparged with an anhydrous HF–H$_2$ mixture to remove oxide impurities. A final sparge treatment with hydrogen alone reduced concentrations of structural metal fluoride impurities to low levels. Approximately 3.91 kg. of this salt preparation was transferred as a liquid into the extraction vessel. The gamma activity in the salt preparation from the $^{233}$Pa was about 1.96×10$^4$ counts per minute per gram of the salt mixture.

Figure 4:
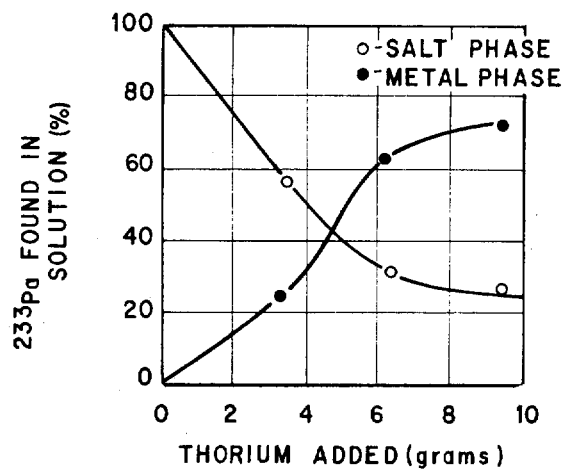
FIG. 4 is a plot showing the distribution of protactinium-233 between the liquid salt phase of $LiF-BeF_2-ThF_4$ (72–16–12, mole percent) and the bismuth metal phase at 650° C. as a function of thorium metal additions.

The results of $^{233}$Pa distribution between the two liquid phases as thorium metal was added to the system at 600° C. are illustrated in FIG. 4. At the thorium solubility limit in bismuth (~3500 p.p.m.), approximately 76% of the $^{233}$Pa activity was in the metal phase and the balance remained in the salt phase. These values correspond to a distribution coefficient (defined as mole fraction in metal phase/mole fraction in salt phase) for protactinium-233 of about 13.5. The separation factor for extracting $^{233}$Pa from thorium is about 520 for this system.

Although no example of separation of protactinium from rare earth fission products is given, this separation can be easily demonstrated. Dividing the separation factor for uranium from cerium in Example I by the separation factor for uranium from protactinium in Example II or III shows the separation factor for protactinium from cerium to be 160 or 480, the exact magnitude depending upon the composition of the molten salt mixture. In either case this factor is large enough to insure good separation.

In summary, it has been shown that in the reductive extraction of uranium and protactinium from molten metallic fluorides into bismuth in a temperature range of about 500° C. to 900° C., an order of nobility exists so that by controlling the concentration of the reductant metal in the bismuth it is possible to substantially separate uranium and then protactinium from thorium and rare earth fission products. Inasmuch as the solvent properties of liquid bismuth are highly unusual and non-ideal and since the chemical properties of protactinium in these systems were very poorly known, it is completely unexpected that such a sequence would exist. The establishment of this sequence provides a basis for separating the bred-in protactinium values from the fertile salt stream of either a single fluid or a two-fluid molten salt breeder reactor as well as from any other such salt mixtures where they may be found.

What is claimed is:

1. A method for separating uranium and protactinium values from spent molten metallic fluoride salt mixtures containing rare earth fission product values comprising the steps of contacting said salt mixture with molten bismuth, adjusting the quantity of a metal reductant having a nobility less than uranium and protactinium added to said bismuth to thereby sequentially extract said uranium and protactinium from said salt phase into said bismuth, and recovering separately said extracted species from said bismuth.

2. The method of claim 1 wherein said metal reductant is selected from the group consisting of lithium, beryllium, and thorium.

3. The method of claim 1 wherein said molten metallic fluoride salt mixture comprises LiF–BeF$_2$–UF$_4$ (65.97–34.0–0.03, mole percent).

4. The method of claim 1 wherein said molten metallic fluoride salt mixture comprises LiF–BeF$_2$–ThF$_4$–UF$_4$ (72.98–2.0–25.0–0.02, mole percent).

5. The method of claim 1 wherein said molten metallic fluoride salt mixture comprises LiF–BeF$_2$–ThF$_4$–UF$_4$ (71.7–16.0–12.0–0.3, mole percent).

6. The method of claim 1 wherein said rare earth and protactinium values are about 100 p.p.m. and 25 p.p.m., respectively.

7. The method of claim 1 wherein said metal reductant is thorium metal and is provided in a concentration of about 0.003 mole fraction.

8. The method of claim 1 wherein said extraction is conducted at a temperature within the range of 550° to 900° C.

9. The method of claim 1 wherein said spent molten salt comprises LiF–BeF$_2$–ThF$_4$–UF$_4$ (71.7–16.0–12.0–0.3, mole percent), said metal reductant is thorium, and said sequential extraction of the respective species is effected by adding sufficient quantity of said thorium metal to said bismuth to initially reduce substantially all of said uranium tetrafluoride to uranium metal and transfer the reduced uranium metal into said bismuth, contacting said loaded bismuth with a recovery salt while bubbling hydrogen fluoride therethrough to oxidize said extracted uranium metal to uranium tetrafluoride and transfer into said recovery salt and thereafter repeating the sequence of reduction, extraction and oxidation for the protactinium values.

References Cited

UNITED STATES PATENTS

| | | | |
|---|---|---|---|
| 3,395,991 | 8/1968 | Grimes et al. | 23—325 |
| 3,310,500 | 3/1967 | Kelly | 23—325 |
| 3,130,042 | 4/1964 | Teitel | 23—325 |

OTHER REFERENCES

Bareis et al., Fused Salts for Removing Fission Products From U-Bi Fuels, Nucleonics 12, #7, 1954, pp. 16–19.

CARL D. QUARFORTH, Primary Examiner

MICHAEL J. McGREAL, Assistant Examiner

U.S. Cl. X.R.

23—339, 343